United States Patent
Kure (10) Patent No.: US 9,102,291 B2
(45) Date of Patent: Aug. 11, 2015

(54) BULLDOZER

(75) Inventor: Kazuki Kure, Kishiwada (JP)

(73) Assignee: KOMATSU LTD., Tokyo (JP)

( * ) Notice: Subject to any disclaimer, the term of this patent is extended or adjusted under 35 U.S.C. 154(b) by 195 days.

(21) Appl. No.: 13/809,051

(22) PCT Filed: Aug. 13, 2012

(86) PCT No.: PCT/JP2012/070639
§ 371 (c)(1),
(2), (4) Date: Jan. 8, 2013

(87) PCT Pub. No.: WO2013/145360
PCT Pub. Date: Oct. 3, 2013

(65) Prior Publication Data
US 2014/0224558 A1  Aug. 14, 2014

(30) Foreign Application Priority Data
Mar. 28, 2012 (JP) ................. 2012-073811

(51) Int. Cl.
*B60R 19/52* (2006.01)
*E02F 3/80* (2006.01)
*E02F 3/76* (2006.01)
*E02F 9/08* (2006.01)

(52) U.S. Cl.
CPC .............. *B60R 19/52* (2013.01); *E02F 3/7609* (2013.01); *E02F 3/80* (2013.01); *E02F 9/0866* (2013.01); *E02F 9/0891* (2013.01); *B60R 2019/525* (2013.01)

(58) Field of Classification Search
USPC ............ 180/68.1, 68.2, 68.3, 68.4, 68.6, 309, 180/291, 296; 165/77
See application file for complete search history.

(56) References Cited

U.S. PATENT DOCUMENTS

| | | | | |
|---|---|---|---|---|
| 3,834,478 A * | 9/1974 | Alexander et al. | ........... | 180/68.6 |
| 3,897,850 A * | 8/1975 | Thompson et al. | ........... | 181/204 |
| 4,023,625 A * | 5/1977 | Krolak et al. | ................ | 172/831 |
| 4,334,588 A * | 6/1982 | Tezuka et al. | ................ | 180/68.6 |
| 5,386,873 A * | 2/1995 | Harden et al. | .................. | 165/47 |
| 5,785,139 A | 7/1998 | Freedy et al. | | |
| 6,024,164 A * | 2/2000 | Sorbel | ............................ | 165/41 |
| 6,405,825 B1 * | 6/2002 | Yabe et al. | .................... | 181/204 |
| 8,616,265 B2 * | 12/2013 | Fell et al. | ......................... | 165/41 |
| 2005/0077062 A1 | 4/2005 | Fukazawa et al. | | |
| 2008/0023174 A1 | 1/2008 | Nakae et al. | | |

FOREIGN PATENT DOCUMENTS

| | | |
|---|---|---|
| JP | 62-49429 | 3/1987 |
| JP | 5-35889 | 9/1993 |
| JP | 6-10061 | 2/1994 |

(Continued)

*Primary Examiner* — J. Allen Shriver, II
*Assistant Examiner* — Bridget Avery
(74) *Attorney, Agent, or Firm* — Drinker Biddle & Reath LLP (57) ABSTRACT

A front grille including a rotation plate is attached to the front end of a body. A grille open-state dimension of the rotation plate relative to a shaft is set to be smaller than a minimum distance among distances between the front end of the body and the backside surface of a blade in the front/back direction of the body when the lower end of the blade is in contact with a level surface. In this way, there can be obtained a bulldozer having a front grille that facilitates cleaning, that has excellent durability, and that provides excellent workability in an opening/closing operation.

4 Claims, 8 Drawing Sheets

(56) References Cited

FOREIGN PATENT DOCUMENTS

| JP | 9-309393 | 12/1997 |
| JP | 2001-55098 | 2/2001 |
| JP | 3917448 | 5/2007 |
| JP | 2007-320517 | 12/2007 |
| JP | 2009-507145 | 2/2009 |
| JP | 2009-83803 | 4/2009 |
| JP | 4496048 | 7/2010 |

* cited by examiner

BULLDOZER

TECHNICAL FIELD

The present invention relates to a bulldozer, in particular, a bulldozer having a front grille.

BACKGROUND ART

Work vehicles have radiator grilles (front grilles) for protecting radiators. Most of such radiator grilles are structured to be attachable to and detachable from bodies thereof and openable/closeable so as to facilitate cleaning of the radiators. As an example of such radiator grilles, Japanese Patent Laying-Open No. 2001-55098 (PTL 1) discloses a radiator grille coupled to a body via a hinge in an openable/closeable manner.

Moreover, for example, Japanese Patent Laying-Open No. 2007-320517 (PTL 2) discloses a plurality of shielding plates divided in the upward/downward direction so as to close a radiator opening in an openable/closeable manner.

CITATION LIST

Patent Literature

[PTL 1] Japanese Patent Laying-Open No. 2001-55098
[PTL 2] Japanese Patent Laying-Open No. 2007-320517

SUMMARY OF INVENTION

Technical Problem

Generally, a small bulldozer is used to level a ground. Hence, as the bulldozer is smaller, the position of a blade (dozing blade) thereof becomes further away from the front end of the body thereof in the front direction and the height of the blade becomes lower. On the other hand, a large bulldozer is mainly used to dig a ground surface. In order to dig the ground surface, weight needs to be added to the blade thereof. Accordingly, as the bulldozer is larger, the position of the blade comes closer to the front end of the body thereof and the height of the blade becomes higher.

In the radiator grille described in Japanese Patent Laying-Open No. 2001-55098, in the case where the position of the blade comes closer to the front end of the body and the height thereof becomes higher than the front end of the body, the backside surface of the blade interferes with the radiator grille in the rotation direction thereof, with the result that the radiator grille cannot be opened fully. When cleaning the front side of the radiator of the bulldozer, the radiator grille is opened. However, because the radiator grille cannot be opened fully, there is a difficulty in cleaning.

Meanwhile, the plurality of shielding plates described in Japanese Patent Laying-Open No. 2007-320517 are divided in the upward/downward direction. Accordingly, due to the weight of each shielding plate, a joint portion (a pin or a bracket) between the shielding plate and the body and a joint portion (hinge) between the shielding plates have low durability. Moreover, because the plurality of shielding plates are divided in the upward/downward direction, workability in opening/closing the shielding plate is low due to the weight of each shielding plate.

The present invention has been made in view of the foregoing problem, and has its object to provide a bulldozer having a front grille that facilitates cleaning, that has excellent durability, and that provides excellent workability in an opening/closing operation.

Solution to Problem

A bulldozer of the present invention includes: a body; a front grille attached to a front end of the body; and a blade disposed in front of the front grille with a space interposed therebetween. The blade has an upper end located at a position higher than a lower end of the front grille when a lower end of the blade is in contact with a level surface. The front grille includes a first rotation plate having one end supported by the body so as to be rotatable relative to a first shaft extending in a upward/downward direction of the body. A first dimension of the first rotation plate relative to the first shaft is smaller than a minimum distance among distances between the front end of the body and a backside surface of the blade in a front/back direction of the body when the lower end of the blade is in contact with the level surface. Here, the first dimension refers to a length from the front end of the body to the other end of the first rotation plate when the first rotation plate is opened by 90° relative to the width direction of the body.

According to the bulldozer of the present invention, the first dimension of the first rotation plate relative to the first shaft is smaller than the minimum distance among the distances between the front end of the body and the backside surface of the blade in the front/back direction of the body. Thus, even when the upper end of the blade is located at the position higher than the lower end of the front grille, the blade does not interfere with the first rotation plate in the rotation direction thereof. Accordingly, the first rotation plate can be fully opened by rotating it from its closed position by 90° or greater relative to the width direction of the body. This facilitates cleaning.

Further, because the first rotation plate is rotatable relative to the first shaft extending in the upward/downward direction of the body, durability becomes excellent in the joint portion provided by the first shaft between the first rotation plate and the body and workability becomes excellent in an opening/closing operation.

In the bulldozer, the front grille includes a fixation plate attached to the front end of the body so as not to rotate.

In this way, strength of the body can be improved.

In the bulldozer, the front grille includes a second rotation plate having the other end supported by the body so as to be rotatable relative to a second shaft extending in the upward/downward direction of the body. A second dimension of the second rotation plate relative to the second shaft is smaller than the minimum distance among the distances between the front end of the body and the backside surface of the blade in the front/back direction of the body. The fixation plate is disposed in a central portion of the front grille. The first rotation plate is disposed lateral to one side of the fixation plate and the second rotation plate is disposed lateral to the other side of the fixation plate. Here, the second dimension refers to a length from the front end of the body to the one end of the second rotation plate when the second rotation plate is opened by 90° relative to the width direction of the body.

In this way, the fixation plate thus disposed in the central portion of the front end of the body in the width direction of the body provides reinforcement for the strength of the body at the central portion of the front end of the body. In addition, first and second rotation plates can be opened at the ends of the front end of the body in the width direction of the body so as to clean the radiator. Further, by dividing the front grille into the fixation plate and the first and second rotation plates, the first and second dimensions of the first and second rotation plates relative to the shafts can be readily made smaller than the minimum distance among the distances between the front end of the body and the blade in the front/back direction of the body. Further, by dividing the front grille into the fixation plate and the first and second rotation plates, the plates can be replaced individually.

In the bulldozer, the first shaft is disposed at a side of the first rotation plate opposite to the fixation plate, and the second shaft is disposed at a side of the second rotation plate opposite to the fixation plate.

Accordingly, the first and second rotation plates can be opened and closed in a manner of double doors.

The bulldozer further includes: a radiator disposed in an engine compartment of the body; a fan disposed in the engine compartment and closer to the front end of the body relative to the radiator; and a fan driving source disposed closer to the front end of the body relative to the fan and connected to the fan. The fixation plate is attached to the front end of the body so as to cover a front side of the fan driving source.

Accordingly, the fan driving source can be securely protected by the fixation plate and the radiator can be cleaned with the location of the fan driving source being avoided.

Advantageous Effects of Invention

As described above, according to the present invention, there can be implemented a bulldozer having a front grille that facilitates cleaning, that has excellent durability, and that provides excellent workability in an opening/closing operation.

DESCRIPTION OF EMBODIMENTS

The following describes embodiments of the present invention based on figures.

Figure 1:
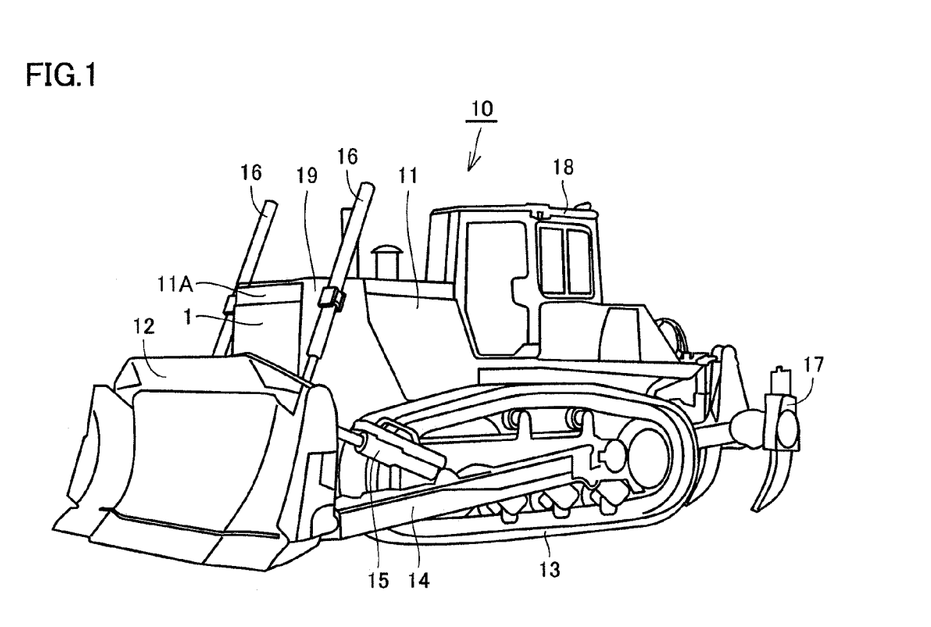
FIG. 1 is a perspective view schematically showing a configuration of a bulldozer in one embodiment of the present invention.

Referring to FIG. 1, a bulldozer 10 of the present embodiment mainly includes: a matched pair of traveling apparatuses including crawler type carriers 13 and separated from each other in the width direction; a body 11 disposed between the matched pair of traveling apparatuses; a blade 12 disposed in front of body 11; a ripper apparatus 17 disposed in back of body 11; and a front grille 1 attached to front end 11A of body 11.

Body 11 has a cab (operator's cab) 18 and an engine compartment 19. Cab 18 occupies the upper backside portion of body 11, and engine compartment 19 is disposed in front of cab 18.

Figure 2:
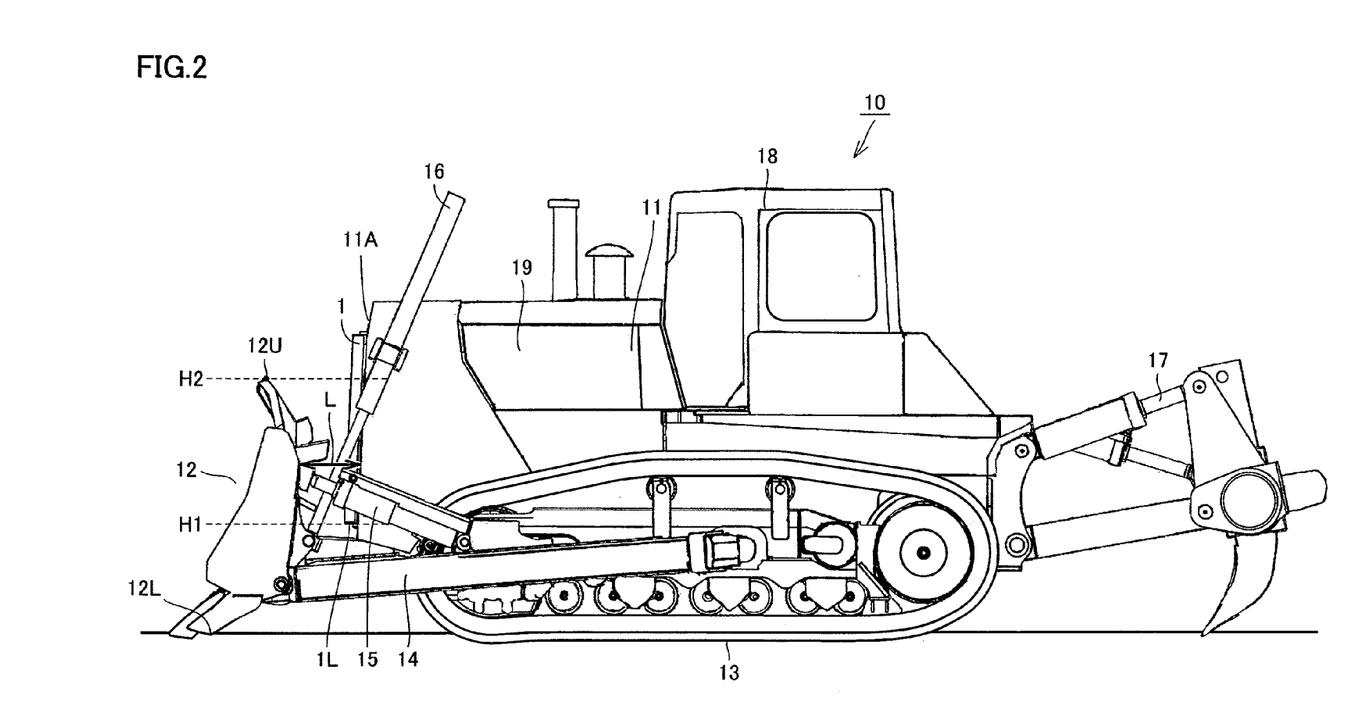
FIG. 2 is a side view schematically showing the configuration of the bulldozer in the embodiment of the present invention.

Referring to FIG. 2, blade 12 has left and right sides supported by frames 14, and is provided to be operated by tilt cylinders 15 and lift cylinders 16. Each of frames 14 is a member having a shape of quadrangular prism, has one end attached to the backside surface of blade 12 by a rotatable support, and has the other end pivotably supported by a side surface of the traveling apparatus. Each of tilt cylinders 15 has one end pivotably supported by the backside surface of blade 12, and has the other end pivotably supported by the upper surface of frame 14. This tilt cylinder 15 is extended and contracted by hydraulic pressure to move upper end 12U in the front/back direction (leftward/rightward in FIG. 2) relative to a support formed by frame 14 of blade 12, thereby controlling a posture of blade 12 in the front/back direction. Each of lift cylinders 16 has one end pivotably supported by the backside surface of blade 12, and has an intermediate portion pivotably supported by a side surface of body 11. This lift cylinder 16 is extended or contracted by hydraulic pressure to move blade 12 in the upward/downward direction relative to the other end of frame 14. This blade 12 is disposed in front of front grille 1 with a space interposed therebetween. Blade 12 has upper end 12U located at a position H2 higher than height position H1 of lower end 1L of the front grille when lower end 12L of blade 12 is in contact with a level ground surface.

Figure 3:
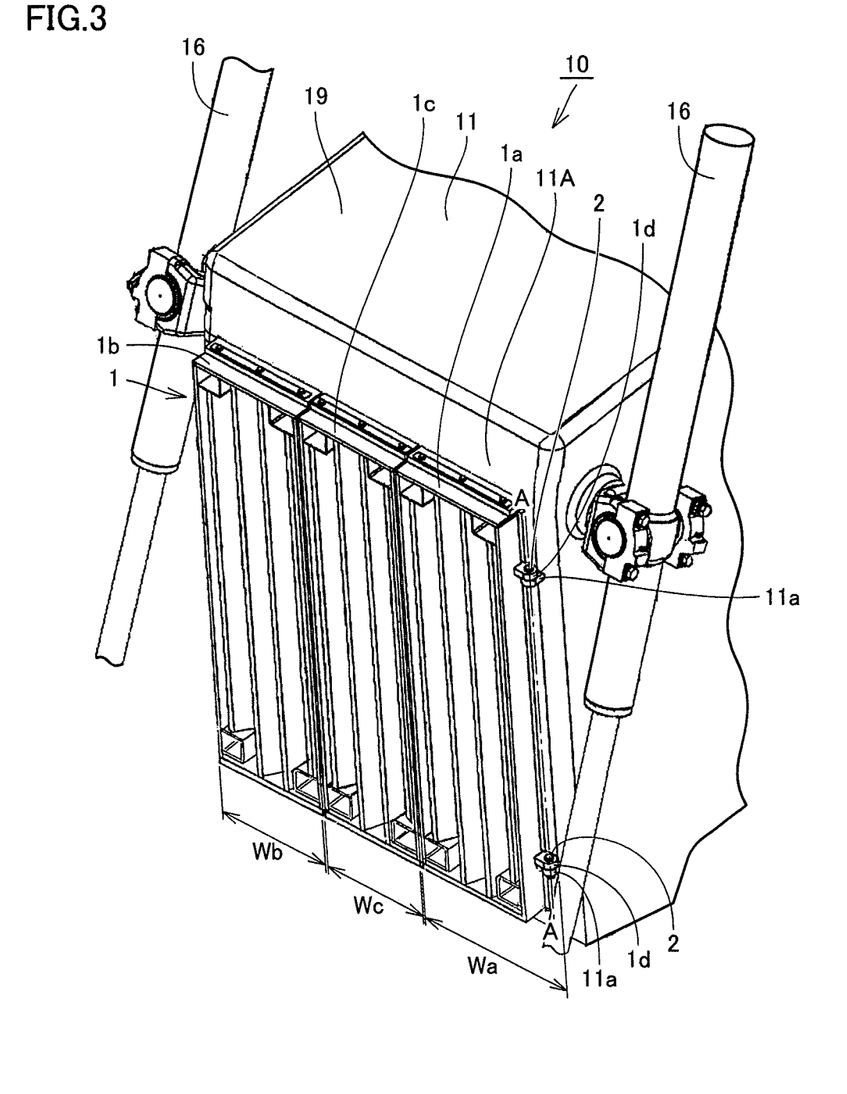
FIG. 3 is a perspective view schematically showing a state in which a front grille disposed in the front end of the body is closed.
Figure 4:
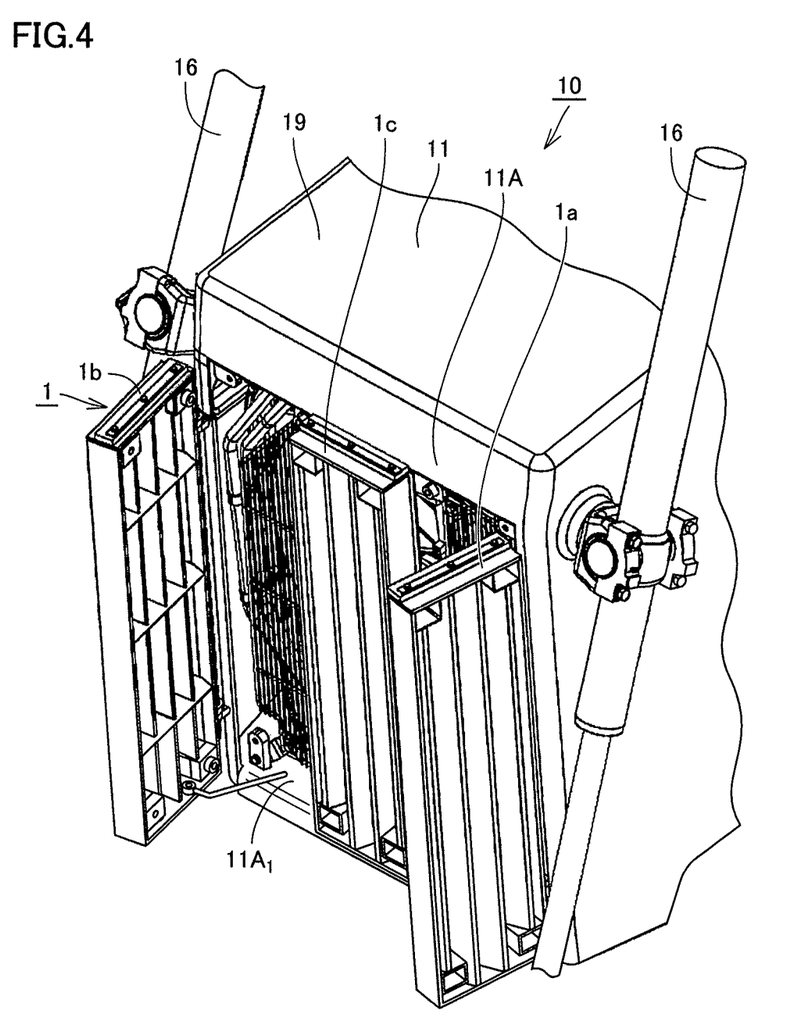
FIG. 4 is a perspective view schematically showing a state in which a front grille disposed in the front end of the body is opened.

Referring to FIG. 3 and FIG. 4, front grille 1 is disposed to cover a radiator opening $11A_1$ in front end 11A of body 11. This front grille 1 has two rotation plates 1a, 1b, and a fixation plate 1c. Fixation plate 1c is disposed in a central portion of front end 11A of body 11 in the width direction of the body, i.e., is disposed in a central portion of front grille 1, so as to cover radiator opening $11A_1$ in the upward/downward direction. Each of two rotation plates 1a, 1b is disposed lateral to fixation plate 1c so as to cover radiator opening $11A_1$ in the upward/downward direction. In other words, one rotation plate 1a is disposed lateral to one side of fixation plate 1c, and the other rotation plate 1b is disposed lateral to the other side of fixation plate 1c.

Two rotation plates 1a, 1b are attached to body 11 so as to be rotatable relative to shafts 2. Each of shafts 2 has an axis line A-A extending in the upward/downward direction of body 11. It should be noted that when front end 11A of body 11 is inclined, axis line A-A of shaft 2 extends along the inclined surface in the upward/downward direction of body 11.

This shaft 2 is inserted in a shaft hole of a bracket 1d provided in each of the sides of rotation plates 1a, 1b, and is inserted in a shaft hole of a bracket 11a provided in body 11. Bracket 1d and shaft 2 are disposed at a side of each of two rotation plates 1a, 1b opposite to fixation plate 1c.

Two rotation plates 1a, 1b respectively have grille open-state dimensions Wa, Wb (FIG. 3) relative to shafts 2 (relative to axis lines A-A). Each of grille open-state dimensions Wa, Wb is set to be smaller than a minimum distance L (FIG. 2) among distances between front end 11A of body 11 and the backside surface of blade 12 in the front/back direction of body 11 when lower end 12L of blade 12 is in contact with the ground surface. Here, each of grille open-state dimensions Wa, Wb refers to a dimension from front end 11A of the body to each of the ends of rotation plates 1a, 1b opposite to shafts 2 when each of rotation plates 1a, 1b is opened by 90° relative to the width direction of body 11. Grille open-state dimensions Wa, Wb are equal to the lengths of the rotation plates including bracket 1d in the radial directions of rotation shafts 2.

Here, for example, minimum distance L refers to a distance smallest among distances between front end 11A of body 11 and the backside surface of blade 12 in the front/back direction of body 11 in a pitch damp state in which the backside surface of blade 12 is brought furthest away from front end 11A of body 11 by extending tilt cylinders 15 the most when lower end 12L of blade 12 is in contact with the ground surface.

Figure 5:
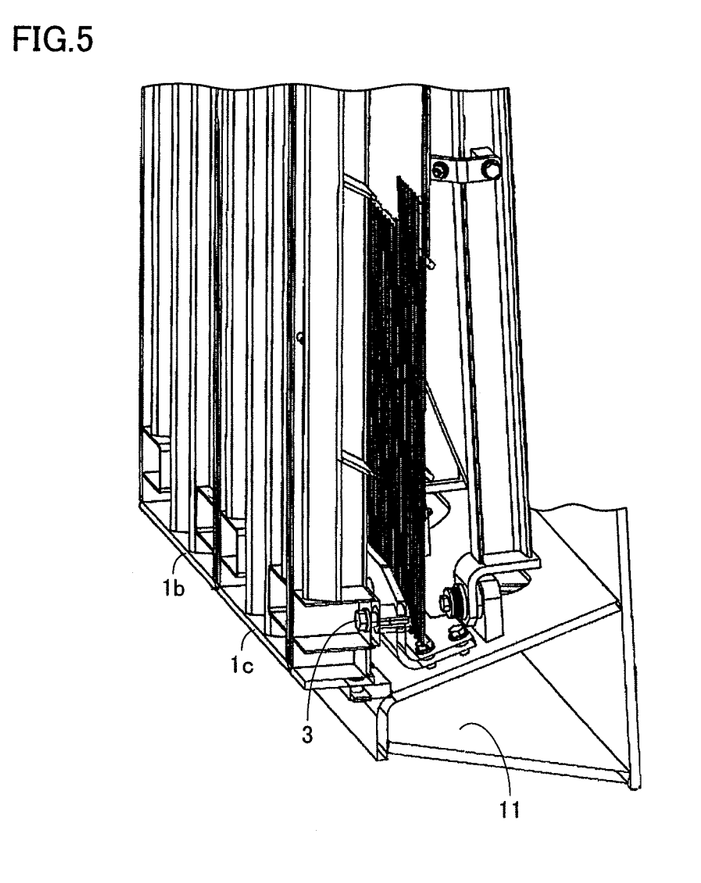
FIG. 5 is a partial cutaway perspective view showing that a fixation plate of the front grille is fixed to the body.

Referring to FIG. 5, fixation plate 1c is attached and fixed to body 11 by a bolt 3 or the like so as not to rotate. FIG. 5 shows that the lower portion of fixation plate 1c is fixed to body 11 by bolt 3, but the upper portion of fixation plate 1c is also fixed to body 11 by a bolt or the like.

Figure 6:
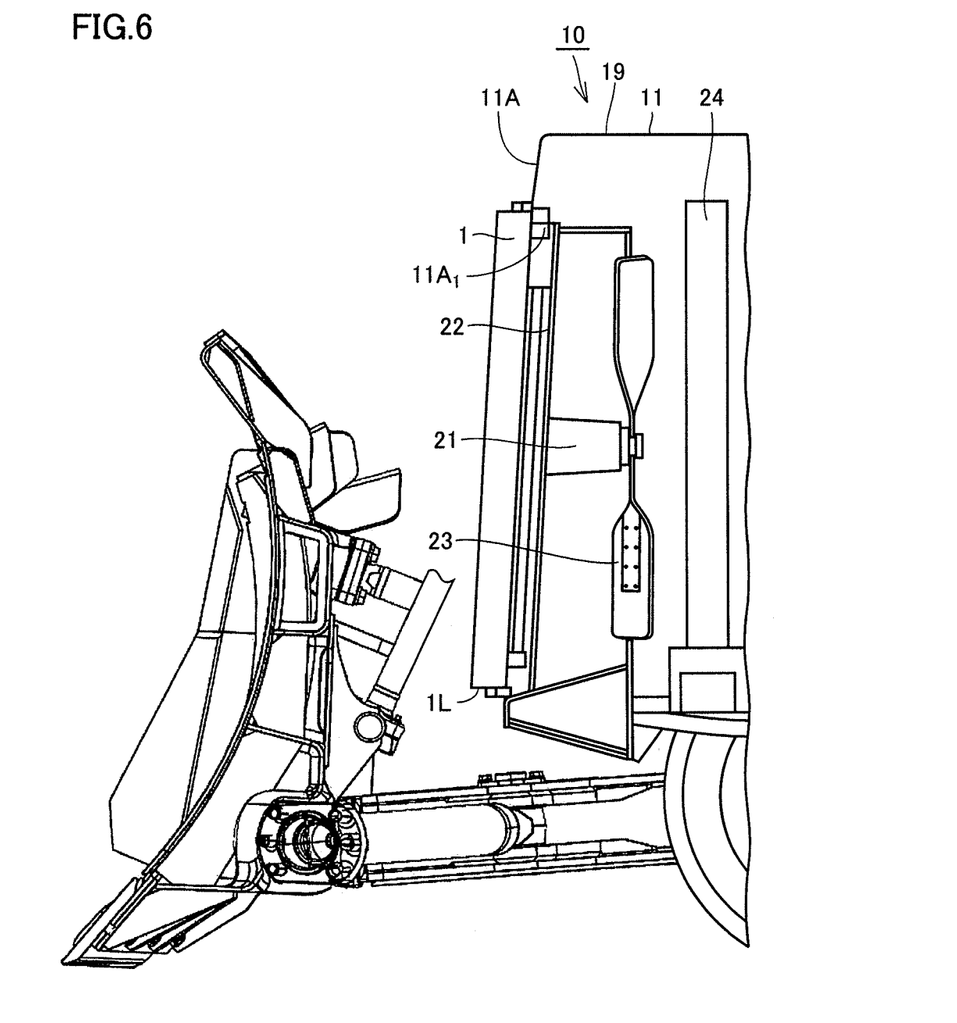
FIG. 6 is a cross sectional view for illustrating an arrangement of a radiator, a fan, a fan driving source, and the front grille.

Referring to FIG. 6, a radiator 24, a fan 23, a fan driving source 21, a fan support 22, and the like are disposed in engine compartment 19, apart from the engine (not shown). Radiator 24 is a device for cooling a coolant circulating between the engine and radiator 24, and is disposed closer to front end 11A of body 11 relative to the engine. Fan 23 is adapted to generate air flow passing through radiator 24 from the backside to the front side of radiator 24, and is disposed closer to front end 11A of body 11 relative to radiator 24.

Fan driving source 21 provides fan 23 with driving power for rotating fan 23, when connected to fan 23. An example of fan driving source 21 is a motor. This fan driving source 21 is disposed closer to front end 11A of body 11 relative to fan 23, and is attached to body 11 with fan support 22 interposed therebetween.

Figure 7:
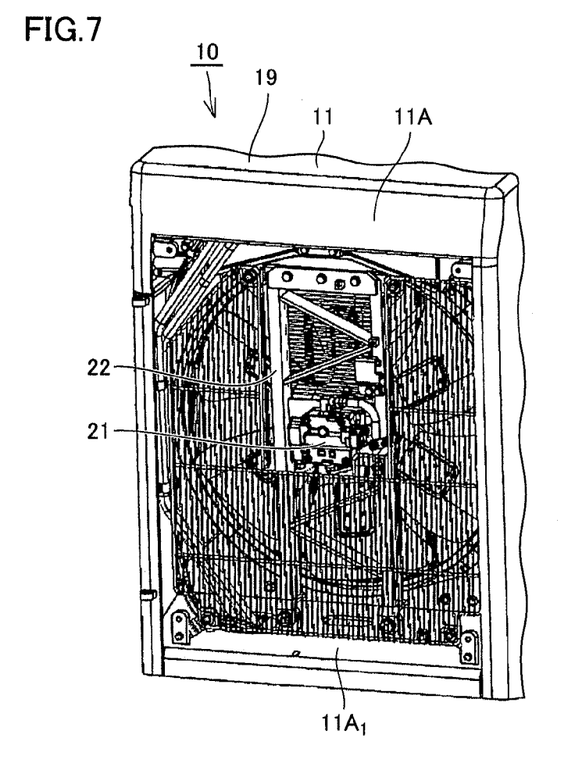
FIG. 7 is a schematic perspective view showing a state in which the front grille is removed from the front end of the body.

Referring to FIG. 7, fan support 22 is disposed in the central portion of radiator opening $11A_1$ in the width direction of the body so as to connect the upper side and lower side of radiator opening $11A_1$ to each other. Fixation plate 1c shown in FIG. 3 and FIG. 4 is attached to front end 11A of body 11 so as to cover this fan support 22 and fan driving source 21 in the front side of body 11.

The following describes cleaning of radiator 24 of the bulldozer of the present embodiment.

Referring to FIG. 4, in order to clean radiator 24, each of two rotation plates 1a, 1b of front grille 1 is rotated to expose radiator opening $11A_1$. When radiator opening $11A_1$ is exposed from each of two rotation plates 1a, 1b, an operator uses an air gun to jet air to radiator 24 via the exposed portion of radiator opening $11A_1$, thereby cleaning radiator 24.

The following describes function and effect of the present embodiment.

Figure 8:
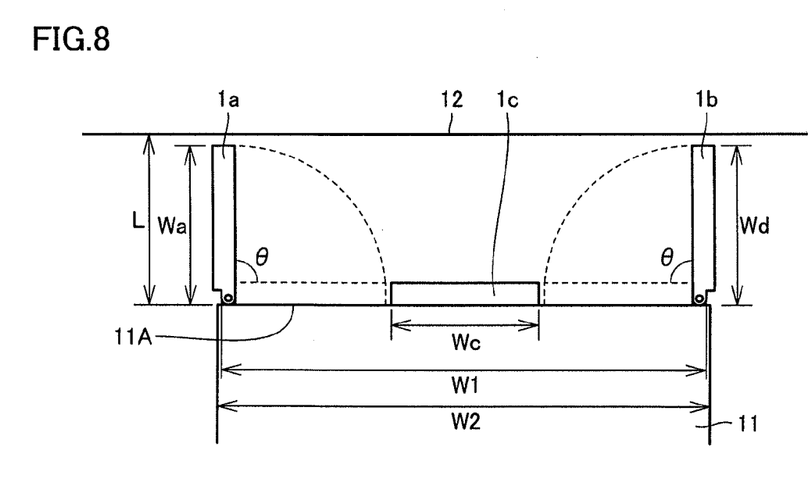
FIG. 8 illustrates a range of rotation angle of the rotation plate in the case where the rotation plate is rotated relative to its side opposite to the fixation plate.

According to the bulldozer of the present embodiment, as shown in FIG. 8, each of grille open-state dimensions Wa, Wb (FIG. 3) of rotation plates 1a, 1b relative to shafts 2 is smaller than minimum distance L (FIG. 2) among the distances between front end 11A of body 11 and the backside surface of blade 12 in the front/back direction of body 11. Accordingly, even when height position H2 of upper end 12U of blade 12 is higher than height position H1 of lower end 1L of front grille 1 as shown in FIG. 2, blade 12 does not interfere with each of rotation plates 1a, 1b in the rotation direction thereof as shown in FIG. 8. Accordingly, rotation plates 1a, 1b can be fully opened by rotating them from their closed positions by 90° or greater relative to the width direction of body 11. This facilitates cleaning.

Further, as shown in FIG. 3, rotation plates 1a, 1b are rotatable relative to shafts 2 extending in the upward/downward direction of body 11. Hence, durability becomes excellent in the joint portion (shaft 2 and brackets 1d, 11a) formed by shaft 2 between body 11 and each of rotation plates 1a, 1b, while workability in opening/closing operation becomes excellent.

Further, front grille 1 includes fixation plate 1c attached to front end 11A of body 11 so as not to rotate. In this way, strength of body 11 can be improved.

Further, front grille 1 has rotation plate 1a disposed lateral to one side of fixation plate 1c, and has rotation plate 1b disposed lateral to the other side of fixation plate 1c. In this way, fixation plate 1c thus disposed in the central portion of front end 11A of body 11 in the width direction of the body provides reinforcement for the strength of the central portion of front end 11A. In addition, rotation plates 1a, 1b can be opened at the ends of front end 11A in the width direction of the body so as to clean radiator 24. Further, by dividing front grille 1 into fixation plate 1c and two rotation plates 1a, 1b, two rotation plates 1a, 1b can be readily provided with grille open-state dimensions Wa, Wb relative to shafts 2 such that each of grille open-state dimensions Wa, Wb is smaller than distance L described above. Further, by dividing front grille 1 into fixation plate 1c and two rotation plates 1a, 1b, the plates can be replaced individually.

Further, shaft 2 is disposed opposite to the fixation plate 1c side of each of two rotation plates 1a, 1b. Hence, two rotation plates 1a, 1b can be opened/closed in a manner of double doors.

Further, fixation plate 1c is attached to front end 11A of body 11 so as to cover the front side of fan driving source 21. Accordingly, fan driving source 21 can be securely protected by fixation plate 1c, and radiator 24 can be cleaned with the location of fan driving source 21 being avoided.

Other Embodiments

In the above-described embodiment, it has been illustrated that each of two rotation plates 1a, 1b is configured to be rotated relative to its side opposite to fixation plate 1c as shown in FIG. 4 and FIG. 8. However, as shown in FIG. 9, each of two rotation plates 1a, 1b may be configured to be rotated relative to its side adjacent to fixation plate 1c.

Figure 9:
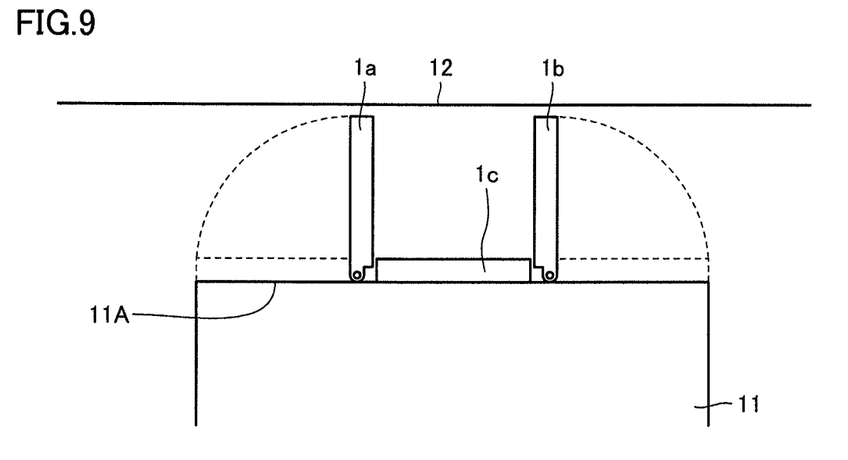
FIG. 9 illustrates rotation of the rotation plate in the case where the rotation plate is rotated relative to its side adjacent to the fixation plate.

Moreover, one of two rotation plates 1a, 1b may be configured to be rotated relative to its side opposite to fixation plate 1c as shown in FIG. 8, and the other of two rotation plates 1a, 1b may be configured to be rotated relative to its side adjacent to fixation plate 1c as shown in FIG. 9.

Further, in the above-described embodiment, it has been illustrated that front grille 1 is divided into the three components in the width direction of the body. However, front grille 1 may include at least one rotation plate, which is set to have a grille open-state dimension relative to shaft 2 such that the grille open-state dimension becomes smaller than distance L shown in FIG. 2. Further, front grille 1 may be configured to be divided into four or more components in the width direction of the body.

Further, grille open-state dimensions Wa, Wb of two rotation plates 1a, 1b shown in FIG. 8 and dimension Wc of fixation plate 1c in the width direction may be the same or different in length. Further, dimensions Wa, Wb of two rotation plates 1a, 1b in the radial direction may be the same or different from each other.

Further, as shown in FIG. 8, distance L described above is smaller than a dimension W1 of the front end of body 11 in the width direction of the body, and is smaller than a dimension W2 (=Wa+Wb+Wc) of front grille 1 in the width direction of the body.

Further, each of rotation plates 1a, 1b may be configured to be rotated by 90° or greater, and may be configured to be capable of being fixed (maintained) at a predetermined rotation position.

Further, in the above-described embodiment, the radiator grille has been illustrated, but front grille 1 is not limited to the radiator grille and may be a grille that is attached to front end 11A of body 11 and that needs to be opened/closed.

Further, in the above-described embodiment, blade 12 is in a frontward tilting posture by being brought into the pitch damp state by extending tilt cylinders 15 the most with lower end 12L of blade 12 being in contact with the ground surface. However, blade 12 may be in a backward tilting posture by being brought into a pitch back state by contracting tilt cylinders 15 the most. In the case where the posture of the blade in the pitch back state is regarded as a reference posture, each of the rotation plates can be rotated by 90° or greater even if blade 12 has any posture when being in contact with the ground.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: front grille; 1L, 12L: lower end; 1a, 1b: rotation plate; 1c: fixation plate; 1d, 11a: bracket; 2: shaft; 3: bolt; 10: bulldozer; 11: body; 11A: front end; $11A_1$: radiator opening; 12: blade; 12U: upper end; 13: crawler type carrier; 14: frame; 15: tilt cylinder; 16: lift cylinder; 17: ripper apparatus; 18: cab; 19: engine compartment; 21: fan driving source; 22: fan support; 23: fan; 24: radiator.

The invention claimed is:

1. A bulldozer comprising:
   a body;
   a radiator disposed in said body;
   a front grille attached to a front end of said body and disposed in front of said radiator; and
   a blade disposed in front of said front grille with a space interposed therebetween,
   said blade having an upper end located at a position higher than a lower end of said front grille when a lower end of said blade is in contact with a level surface,
   said front grille formed of a first rotation plate having one end supported by said body so as to be rotatable relative to a first shaft extending in an upward/downward direction of said body, said first shaft and said first rotation plate being disposed in front of said front end of said body,
   when it is assumed that a first dimension represents a length from said front end of said body to the other end of said first rotation plate when said first rotation plate is opened by 90° relative to a width direction of said body, said first dimension of said first rotation plate being smaller than a minimum distance among distances between said front end of said body and a backside surface of said blade in a front/back direction of said body when said lower end of said blade is in contact with the level surface,
   said front grille further formed of a fixation plate attached to and disposed in front of said front end of said body so as not to rotate.

2. The bulldozer according to claim 1, wherein
   said front grille is further formed of a second rotation plate having the other end supported by said body so as to be rotatable relative to a second shaft extending in said upward/downward direction of said body,
   when it is assumed that a second dimension represents a length from said front end of said body to one end of said second rotation plate when said second rotation plate is opened by 90° relative to the width direction of said body, said second dimension of said second rotation plate is smaller than the minimum distance among the distances between said front end of said body and the backside surface of said blade in said front/back direction of said body,
   said fixation plate is disposed in a central portion of said front grille, and
   said first rotation plate is disposed lateral to one side of said fixation plate and said second rotation plate is disposed lateral to the other side of said fixation plate.

3. The bulldozer according to claim 1, further comprising:
   the radiator disposed in an engine compartment of said body;
   a fan disposed in said engine compartment and closer to said front end of said body relative to said radiator; and
   a fan driving source disposed closer to said front end of said body relative to said fan and connected to said fan, wherein
   said fixation plate is attached to said front end of said body so as to cover a front side of said fan driving source.

4. The bulldozer according to claim 2, wherein
   said first shaft is disposed at a side of said first rotation plate opposite to said fixation plate, and
   said second shaft is disposed at a side of said second rotation plate opposite to said fixation plate.

* * * * *